Sept. 21, 1965  G. NIEMANN  3,206,993
SPUR-GEAR TRAINS
Filed Aug. 6, 1963  2 Sheets-Sheet 2

Inventor:
Gustav Niemann
BY Nolte & Nolte
Attorneys

United States Patent Office 3,206,993
Patented Sept. 21, 1965

3,206,993
SPUR-GEAR TRAINS
Gustav Niemann, Flemingstrasse 39,
Munich 27, Germany
Filed Aug. 6, 1963, Ser. No. 300,309
Claims priority, application Germany, Aug. 9, 1962,
N 21,937
12 Claims. (Cl. 74—410)

This invention relates to spur-gear trains provided with structures for uniform load distribution over the gear faces.

In known spur-gear systems of this type the gear rim of at least one of the two co-operating gears is supported on its hub or shaft by means of a spherical surface. Leaf springs attached on both sides of the hub and uniformly spaced on the gear periphery serve to hold the gear in the mid-position in which the axes of the rim and the hub coincide.

In such a gear-system structure the gear rim, movable with respect to its hub, always assumes a position in which, when the teeth of the two gears—or of a gear and its pinion—are in meshing engagement, the driving-gear teeth transfer the load uniformly to the driven-wheel teeth so that the load is distributed evenly over the entire tooth faces.

This is of particular importance in spur-gear systems in which the gear faces are of considerable width, and in gear trains having branch-off power paths, since the loads exerted on the gear teeth cause significant elastic deformations and disalignments in the gears themselves as well as in the shafts and bearings, on the one hand, and, on the other, an error in the face angle of only 1/100 of one millimeter in relation to the tooth face width adversely affects the uniformity of the load distribution. If uniform load distribution is secured, the admissible face width, the permissible torsional moment, as well as the reliability of operation can be increased.

In other conventional spur-gear systems having load-equalizing provisions, the gear rim of at least one of the two co-operating gears is mounted on its hub by way of a resilient annular disc so that in this case, too, the gear rim, overcoming a resiliently yielding force, can assume a position relative to its hub at which their respective axes form an angle. Such a spur-gear system, however, lacks flexibility both in peripheral and in radial directions.

It is thus the objective of the present invention to provide a spur gear having a provision for uniform load distribution over the entire tooth face, such structure being simple to manufacture and having the additional advantage in that, apart from the resilient adjustability of the gear-rim axis relative to that of the hub, and necessary for uniform load distribution, it also offers the feature of resilient yieldability of the gear rim, both in peripheral and in radial directions.

In the spur-gear train according to the invention, designed for securing uniform load distribution over the entire tooth-face area, in at least one of the interengaging gears recesses are provided in the inner face of the gear rim, on the one hand, and in the outer face of the hub or shaft, on the other, the latter being spaced apart from the former. The recesses in the rim and in the hub face each other and extend in axial direction of the gear. Members resiliently yieldable in a direction perpendicular to their longitudinal extension are arranged in the recesses in a prestressed state.

The above-described arrangement in at least one gear of a spur-gear system, is already known alone for the purpose of the accommodation of variable loads and for compensation of jolts in peripheral and radial direction.

However, in conventional gear systems every axial or swivelling movement of the gear rim relative to its hub or shaft is prevented by shoulders bracing in axial direction the gear rim against its hub or shaft.

Due to the absence of guidance of the gear rim between axial shoulders, the inventive connection between the gear rim and the hub—by means of resiliently yieldable members arranged in recesses—in addition to offering peripheral and radial yieldingness, makes it possible for the gear rim to yield angularly with its axis relative to that of its hub and the shaft. This means that the gear rim can pivot relative to its hub around an axis disposed at right angles to the rotational axis of the gear. The yieldable members arranged in spaced-apart relationship to the pivot axis are thus resiliently deformed. The gear rim has, therefore, resilient yieldability relative to its hub, in circumferential and radial directions, as well as in pivotal direction around an axis disposed at right angles to the hub or shaft axis so as to have an omnidirectional resiliency.

In order to provide for a satisfactory degree of yieldability of the gear rim around an axis perpendicular to the rotational axis of the gear, given a sufficient degree of torsional-moment transferring ability, the lengths of the yieldable members are preferably smaller than half the width of the gear tooth face, and the members are arranged in the centre relative to the tooth-face width.

An embodiment particularly simple to manufacture is afforded when the cross-sections of the recesses are shaped in such a manner that they tightly enclose the connecting elements. Thus, the resiliently yieldable members do not rest in flat recesses as is the case with the merely rotationally resilient connection between the gear rim and its hub, where the radius of curvature of the recesses is larger than that of the cross-section of the resiliently yielding members.

In the inventive embodiments, the gear can be first manufactured as a unit, including the tooth structure; holes are subsequently bored along a circle concentric with the rotational axis of the gear and disposed radially inside the gear rim zone. Afterwards, the gear rim is separated from its hub along the aforementioned circle by tapping in a separating slit.

After the rim has been separated from its hub these two parts can be re-united by inserting the transversely resiliently yieldable members into the recesses. The resilient compression of these members ensures that the gear rim will assume concentric position. Sleeves rolled from spring plate and having a longitudinal slot—so-called tension cotters or plugs—can be used as resiliently yieldable members in such structures.

The just-described invention embodiment also simplifies the manufacture of gears in which the gear rims are made of a material different from that of the hubs, or have to have physical properties different from those of the hubs. At present, such gears are manufactured by attaching the gear rims, made of a different material or having special physical properties, by shrunk fit to the hubs. Quite apart from a considerable cost involved in such shrink-fitting, there is a danger in that in extreme operative conditions the rims will start slipping in relation to their hubs, rendering the gears useless. When, however, the inventive gear embodiment is used, the gear rim and the hub are concentrically aligned by means of spacers; the recesses are then made in the juxtaposed faces of the gear rim and hub, for example by drilling or milling. Subsequently, tension plugs or other transversely resilient members are inserted in the recesses and seated therein in a transversely compressed state. The invention is thus useful even in cases in which the gear rims are made of a material different from that of the gear hubs, but non-uniform load distribution over the faces is either of minor importance or is not critical at all owing, for example, to relatively narrow tooth faces.

The inventive embodiments of spur-gear trains described hereinabove cannot be simply adapted for helical spur gears, or spur gears with other types of tooth structure, having a free axial tooth-load component, since the latter would prevent the self-alignment of the gear rims for uniform load distribution. At present no spur-gear system exists having a free axial tooth-load component, which would have provision for load equalization over the entire tooth face.

According to one of the main features of the invention, a spur-gear system with a free axial tooth-load component is characterized by a structure in which at least one gear rim of the two co-operating gears is swingable so that its axis can assume an angular position relative to the hub axis, whereby uniform load distribution is assured over the entire width of the tooth face. Particularly advantageous is that structure as above-described in which recesses are provided in the inner face of the gear rim and in the outer face of the hub or shaft, spaced-apart therefrom, the recesses facing each other in radial direction of the gear and in which structure members resiliently yieldable transversely to the longitudinal axis of the recess are arranged under compression in the recesses.

This embodiment is further characterized by the fact that conically shaped annular surfaces are provided on the co-operating gear rims in mutual axial alignment in order to eliminate the effect of the free axial tooth-load component on the self-aligning action of the gear rim. This last-mentioned structure is already known per se for the purpose of preventing relative axial displacement of gears caused by such a tooth-load component.

According to another feature of the invention, at least one of the co-operating annular surfaces has a slightly convex arcuate profile for reasons to be explained hereunder in detail.

In cases where the inventive embodiment of the spur-gear system is used in a epicyclic gear train or some other spur-gear train having one or more intermediate gears, e.g., in gear trains having branch-off power paths, each planet pinion or intermediate gear is given the inventive structure, so as to achieve the objective of the invention.

Other objects and many of the attendant advantages of the invention will be readily appreciated as the same becomes better understood by reference to the following detailed description, when considered with the accompanying drawings, wherein:

FIG. 4 is a fragmentary sectional view, on an enlarged scale as compared to FIG. 1, showing the cooperation between a pair of gears.

Figure 1:
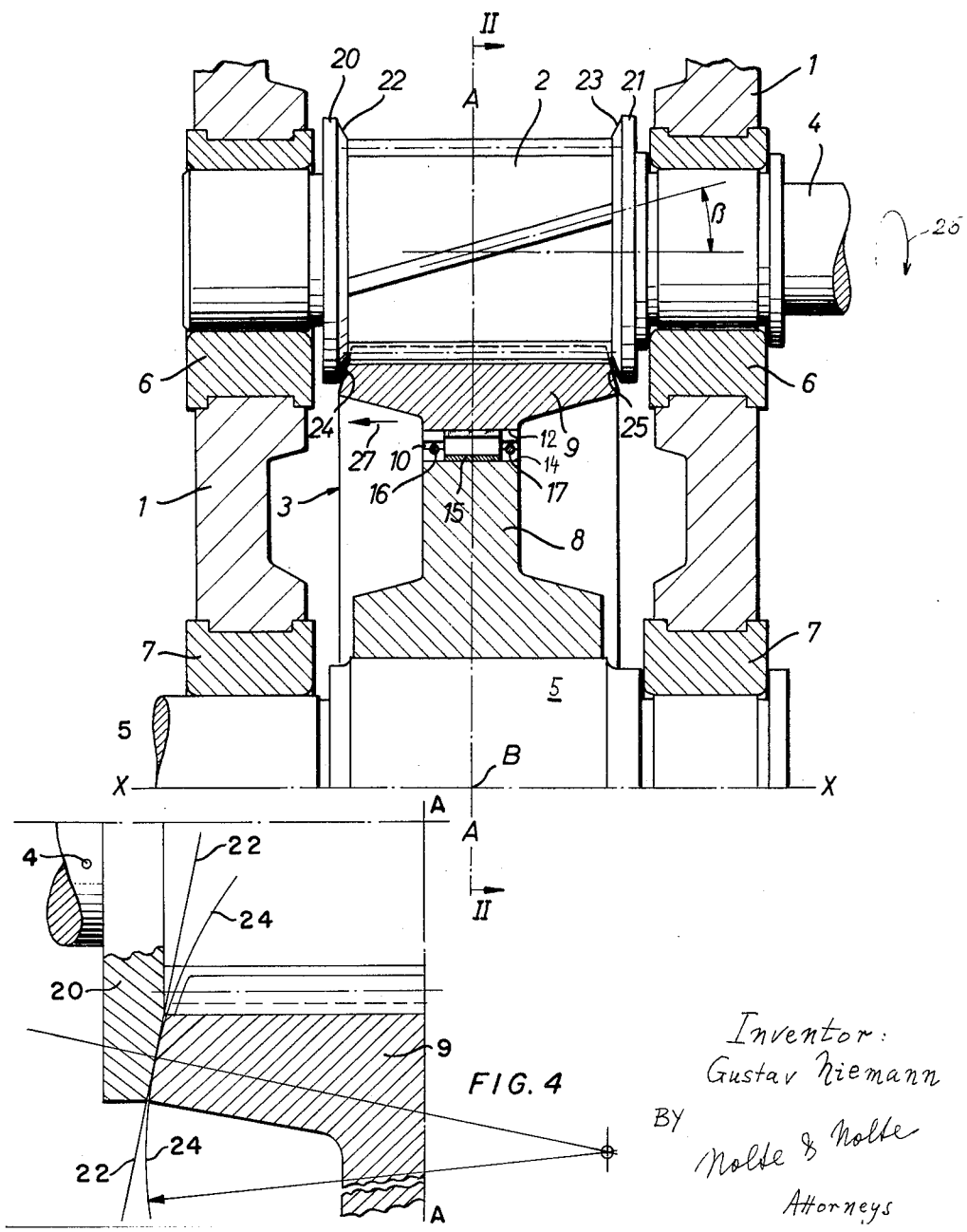
FIG. 1 is a sectional view of a single-stage spur-gear train representing one embodiment of the present invention.
Figure 2:
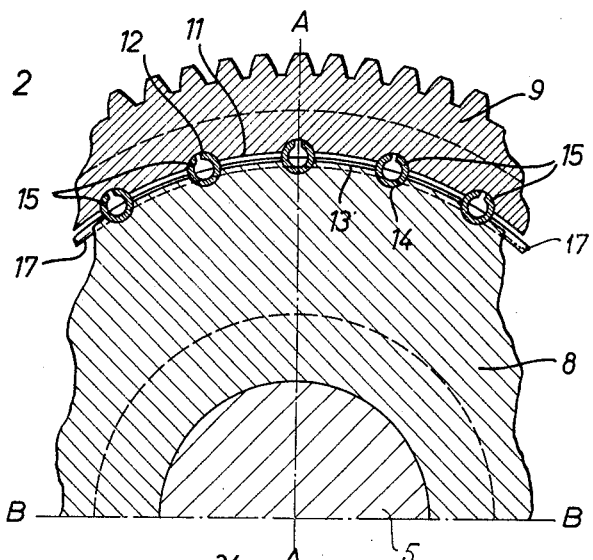
FIG. 2 is a section taken along the line II—II of FIG. 1.

In the spur-gear train shown in FIGS. 1 and 2, corresponding to a preferred inventive embodiment, a pinion 2 and a gear generally designated 3 are supported in a partially shown housing 1. Shaft 4 of the pinion 2, as well as shaft 5 of the gear 3 are supported in the housing 1 by means of eccentric journal boxes 6, 7, respectively. For the sake of simplicity the portions of the gear train below shaft 5 have been omitted from FIG. 1. Gear 3 comprises a hub 8 and a gear rim 9 separated from each other by a slit 10 which extends all the way through gear 3 from one to the other of the opposed outer side faces of the hub portion 8 and rim portion 9 of gear 3. The inner face 11 of the gear rim 9 is provided with arcuate recesses 12 while the outer face 13 of the hub 8 is provided with recesses 14; recesses 12, 14 face each other in pairs.

Collars or so-called tension plugs 15, rolled from spring plate and having a longitudinal slot, are inserted under compression into the recess pairs 12, 14. The length of the tension plugs 15 is appreciably smaller than half the width of the gear tooth face. The plugs are maintained in a central position relative to the tooth face by means of circular springs 16, 17. The latter rest in peripheral grooves arranged in the outer face 13 of the hub 8. In order to ensure uniformity of their resilient characteristics, the tension plugs are inserted in such a way that their longitudinal slots face radially outwardly with respect to the gear axis. It will be noted that the plugs 15 respectively have axes located in the slit 10.

The tooth structure common to the pinion 2 and the gear 3 has an angle of slope or helix angle designated $\beta$, as shown in FIG. 1 for the pinion 2 with respect to the axis of shaft 4. In gears of this type a free axial tooth-load component is present. In order to accommodate such components within the range of the meshing teeth, collars or flanges 20, 21 are provided at the extremities of the pinion 2. These flanges have conically shaped annular surfaces 22, 23 on their respective side faces turned toward each other. Similarly, conically shaped annular surfaces 24, 25 are provided in axial direction on the gear rim 9 opposite said surfaces 22, 23. However, at least one of these latter surfaces 24, 25 may have a convex profile, as shown for the surface 24 in FIG. 4, to prevent seizing.

Bearing misalignments within the gear-train housing 1 are compensated for during assembly by suitable adjustments in the position of the eccentric journal boxes 6 and 7. However, elastic deformations occur in the gear system as a result of tooth loads, affecting the tooth structure itself, as well as the shafts and the gear housing, causing a shift of the load towards one extremity of the tooth faces. This load shift increases with an increase in load transfer. Due to the above-described construction of the gear 3, the tooth structure on the gear rim 9 can adapt itself in all operating conditions to the tooth structure on the pinion 2, since the mode of support of the gear rim 9 on its hub 8 by means of the tension plugs 15 permits a pivoting movement of the gear rim around the axis A—A which is disposed at right angles to the rotational axis X—X of the shaft 5, as well as around axis B—B disposed at right angles to both axes X—X and A—A.

Thus, the gear rim 9 can adapt its geometrical axis with respect to the rotational axis X—X of the shaft 5. When shaft 4 with the pinion 2 is driven in the direction indicated by arrow 26, the axial tooth-load component brought about by the slope angle $\beta$ endeavors to displace the gear rim 9 toward the left, in the direction indicated by arrow 27. This causes the conically shaped annular gear-rim surface 24 to engage the corresponding pinion surface 22. Since the axial tooth-load component is offset within the range of tooth mesh, it cannot influence the self-aligning action of the gear rim 9 relative to the pinion 2 for uniform load distribution over the entire tooth face. In a similar fashion, the surfaces 23, 25 take up the axial tooth load when the shaft 4 is driven in the opposite direction or in case the drive of the pinion 2 is delayed.

In order to avoid end pressures in the pairs of co-operating conically shaped annular surfaces, caused by small swinging movements of the gear rim relative to its hub, one of the two co-operating annular surfaces 22, 24 and 23, 25 is provided with a slightly convex profile.

Figure 3:
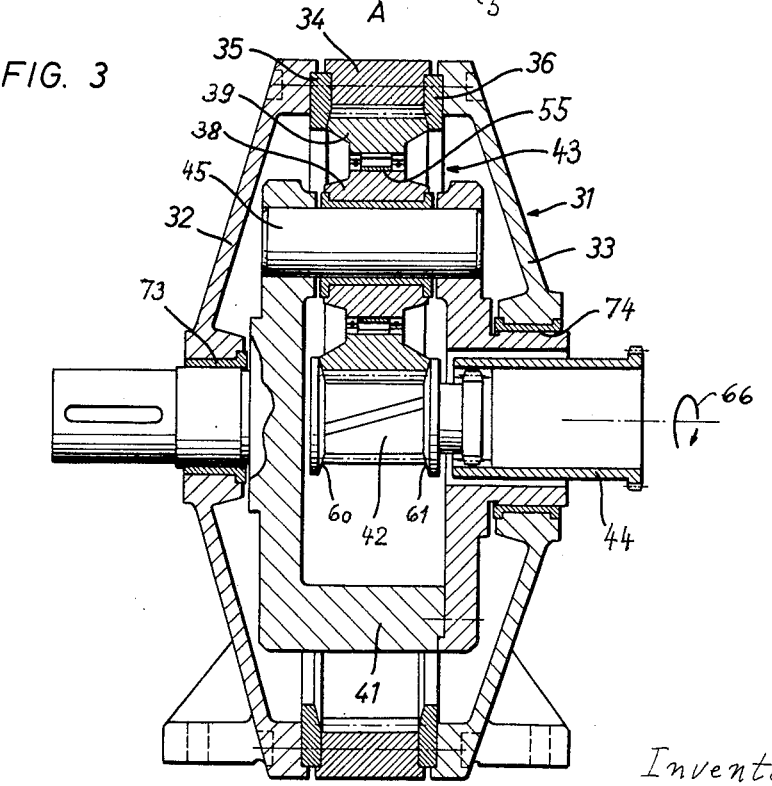
FIG. 3 is a longitudinal section through an epicyclic gear train according to another embodiment of the invention.

In the second inventive embodiment, representing an epicyclic spur-gear train shown in FIG. 3, a housing is generally designated 31 which comprises end walls 32, 33. A gear rim or hollow ring gear 34, provided with inner tooth structure, is clamped between the walls by means of setbolts (not shown). Thrust collars 35, 36 are inserted between the ring gear 34 and the walls 32, 33, these collars being centered in concentrical recesses provided in the opposing faces of said elements. The thrust collars 35, 36 are also provided with conically shaped annular faces which take up the axial thrust between the internally toothed gear rim 34 and planet gears 43 arranged around the circumference.

In FIG. 3, one planet gear 43 is shown for better clarity. As a matter of example, the epicyclic gear train comprises preferably three uniformly spaced planet gears. Planet gears 43 have a structure similar to that of the gear 3 of the spur-gear train shown in FIGS. 1 and 2. Thus, the planet gears 43 each comprise a hub 38 and a a gear rim 39, these elements being connected by means of tension plugs 55. The constructional details are identical with those described, in connection with the first embodiment of the invention, for elements 8–10 and 11–17. The planet gears 43 are supported on pins 45 in a common flange or planetary gear carrier 41. The carrier is in turn rotatably supported at respective points 73, 74 in the end walls 32, 33.

A sunwheel 42 is held in a free-floating manner between the planet gears 43. The sunwheel can freely move in longitudinal (axial) as well as in transverse (radial) directions. The sunwheel 42 is driven from a drive shaft (not shown) by way of a coupling sleeve 44. Collars or flanges 60, 61 are provided at the extremities of the sunwheel 42, the flanges having conically shaped annular faces to take up the free axial tooth-load component between the sunwheel 42 and the planet gears 43. The flanges as well as the contacting annular faces of the sunwheel and the planet gear are identical with those described, in connection with the first embodiment, for elements 2, 9 and 20–25.

The tooth structure common to the sunwheel 42, the planet gears 43 and the ring gear 34 has a slope angle similar to that described with regard to pinion 2 and gear 3 of the first embodiment. When the sunwheel 42 is rotated in the direction indicated by arrow 66 flange 60 of the sunwheel presses against the annular faces of the gear rims 39 of the planet gears 43 due to the inclination of the tooth structure. The gear rims 39 in turn press against the annular face of the thrust collar 36 of the stationary ring gear 34.

With this structure of the spur-gear epicyclic gear train the tooth faces can adjust themselves for uniform load distribution over the entire face width even in cases when the angle of slope of the planet gears 43 differs slightly from that of the sunwheel 42 as well as from that of the ring gear 34, since the rims 39 of the planet gears 43 can adjust themselves freely with respect to the teeth of the ring gear 34 and to those of the sunwheel 42. This because gear rim 39 of every planet gear is swingable around two axes disposed at right angles to one another, as well as to the rotational axis of the given planet gear, owing to the provision of the tension plugs 55 as described in more detail with reference to FIGS. 1 and 2.

A provision can be made in the epicyclic gear train shown in FIG. 3 whereby the rim of the ring gear 34 can also be supported by way of tension plugs on a supporting ring clamped between the end-walls 32, 33, in a manner similar to the structure 8–10 and 15 shown in FIGS. 1 and 2 for gear 3.

It should be understood, of course, that the foregoing disclosure relates only to preferred embodiments of the invention and that it is intended to cover all changes and modifications of the examples described which do not constitute departures from the spirit and scope of the invention as set forth in the appended claims.

I claim:

1. A spur-gear train comprising interengaging driving gear means and driven gear means, at least one of said gear means including a rim portion in meshing engagement with the other gear means and a hub portion surrounded by and spaced from said rim portion, each of said latter portions having a pair of opposed outer side faces, said hub portion and said rim portion respectively having outer and inner annular peripheral surfaces defining between themselves a cylindrical slit extending between said hub and rim portions from one to the other of said outer side faces of each of said portions so that said slit has opposed open ends, said slit being substantially coaxial with said rim and hub portions, and said annular peripheral surfaces respectively being formed with axially extending grooves which are angularly aligned and in register to form a plurality of substantially axial recesses, and said one gear means further including a plurality of plug means respectively located in said recesses and being resilient in a direction at right angles to the longitudinal extension of said recesses as well as compressible and expandable, and said plurality of plug means respectively having axes located in said slit, whereby substantially omnidirectional resilience is provided between said rim portion and said hub portion.

2. A spur-gear train according to claim 1, wherein said plug means are shorter in axial direction than half the width of said rim portion meshing with said other gear means.

3. A spur-gear train according to claim 2, further comprising means inserted in at least one peripheral portion of said slit and transversally to said plug means for securing the latter in a substantially central position within said slit.

4. A spur-gear train according to claim 1, said plug means being held with a tight fit in said recesses.

5. A spur-gear train according to claim 4, wherein said plug means consist of sleeve-shaped members made from springy material and have longitudinal slots therein substantially parallel to the axis of said one gear means.

6. A spur-gear train according to claim 5, wherein said slots are located in substantially radial planes, respectively.

7. A spur-gear train comprising interengaging driving gear means and driven gear means and having a tooth structure with a free axial tooth load component, said spur-gear train comprising a means supporting at least one gear rim of two co-operating gear means for swinging movement about an axis perpendicular to the axis of said one gear rim so that said gear rim axis can assume a position at an angle to the axis of a hub which is surrounded by said one gear rim, whereby uniform load distribution is assured over the entire width of the tooth face, and further comprising axially juxtaposed substantially conical annular surfaces provided on at least one end of toothed rim portions of said first and said second gear means and eliminating the effect of the free axial tooth-load component on the self-aligning action of the gear rim.

8. A spur-gear train according to claim 7, wherein at least one of said annular surfaces has a convex profile, whereby seizing is prevented between the said surfaces.

9. A spur-gear train according to claim 1, wherein said driving gear means and said driven gear means form part of a planetary transmission.

10. A spur gear train according to claim 9, wherein said transmission includes a plurality of planet gears in meshing engagement with a central sun gear and an internally toothed ring gear, each of said planet gears having the structure of said one gear means.

11. A gear comprising an inner hub portion and an outer rim portion surrounding and spaced from said inner hub portion, said portions each having opposed outer side faces, and said hub and rim portions respectively having outer and inner annular surfaces directed toward and spaced from each other to define between themselves a cylindrical slit which is substantially coaxial with said rim and hub portions and which extends from one to the other of said outer side faces of each of said portions so that said slit has opposed open ends, said annular surfaces each being formed with a plurality of axial grooves and the axial grooves of one annular surface being angularly aligned with the axial grooves of the other of said annular surfaces to define therewith a plurality of substantially axial recesses, and a plurality of plug means respectively located in said recesses and being resiliently compressible and expandable as well as resiliently yieldable in a direction at right angles to the longitudinal extension of said recesses, said plurality of plug means respectively having axes parallel to said grooves and situated in said slit, and said hub and rim portions being entirely out of engagement with each other and being interconnected with each other exclusively through said plurality of plug means, whereby substantially omnidirectional resilience and movability is provided between said rim portion and said hub portion.

12. A gear as recited in claim 11 and wherein said rim portion is located in its entirety beyond said slit and said hub portion is located in its entirety inwardly of said slit.

References Cited by the Examiner

UNITED STATES PATENTS

| 1,234,213 | 7/17 | Reno | 74—461 X |
| 1,637,379 | 8/27 | Jensen | 74—410 |
| 2,500,723 | 3/50 | Ware | 74—411 |
| 3,031,896 | 5/62 | Walter | 74—410 |
| 3,090,258 | 5/63 | Zink et al. | 74—410 X |

FOREIGN PATENTS 567,059   5/58   Belgium.

DON A. WAITE, *Primary Examiner.*